United States Patent [19]
Eidling

[11] Patent Number: 4,607,545
[45] Date of Patent: Aug. 26, 1986

[54] ARRANGEMENT FOR STRIPPING SOLID AND STRANDED WIRES

[75] Inventor: Karl Eidling, Egling, Fed. Rep. of Germany

[73] Assignee: Siemens Aktiengesellschaft, Berlin and Munich, Fed. Rep. of Germany

[21] Appl. No.: 784,026

[22] Filed: Oct. 4, 1985

[30] Foreign Application Priority Data

Nov. 2, 1984 [DE] Fed. Rep. of Germany ....... 3440170

[51] Int. Cl.4 ............................................. H02G 1/12
[52] U.S. Cl. .................................................... 81/9.51
[58] Field of Search ................................. 81/9.4, 9.51

[56] References Cited

U.S. PATENT DOCUMENTS 4,261,231  4/1981  Bleakley ............................. 81/9.51

FOREIGN PATENT DOCUMENTS 3132965  3/1983  Fed. Rep. of Germany .

Primary Examiner—Roscoe V. Parker
Attorney, Agent, or Firm—John Francis Moran

[57] ABSTRACT

A comb-like slotted melting arbor (4) having a transverse groove of a size equal to the wire diameter is used to strip insulated, preferably thermoplastic insulated, solid and stranded wires both partially at intermediate sections and at the ends. The arbor is pressed against the solid and/or stranded wire with a specific force and is briefly heated by means of a current pulse.

3 Claims, 2 Drawing Figures

ARRANGEMENT FOR STRIPPING SOLID AND STRANDED WIRES

BACKGROUND OF THE INVENTION

This invention relates to apparatus for stripping insulated wire, and, more particularly it relates to an arrangement for stripping thermoplastic, insulated wire wherein the conductor is solid or stranded wires. The stripping may occur in middle portions of the wire as well as at the ends.

In the thermal stripping of wires, some form of heat is used such as electrical heat or a flame are, for example, employed. These conventional stripping methods have the disadvantage that the length being stripped cannot be accurately controlled so that exceeding the removal of a specific insulation length may result in electrical contact with other parts.

In German patent document No. DE-OS 31 32 965, a method is disclosed for stripping wires, particularly lacquer insulated wires. In this method, the wire to be stripped is passed between two contact strips arranged at right angles to the wire at the location to be stripped and clamped by these with the help of electrodes. The strips are heated by the passage of a current pulse to the extent that the lacquer insulation on the wire is melted and/or vaporized for the width of the contact strips.

Other typical conventional stripping systems are in general useful only for processing the ends of the wire and based on their being combined with additional precisely controlled cutting and stripping blades. In general, and particularly when applied in automated production processes, this results in a number of disadvantages. Such disadvantages includes expensive mechanical apparatus for operating the cutting blades. This mechanical apparatus requires expenditures for maintenance. The mechanical apparatus of these conventional stripping systems also has relatively high weight and large dimensions. Such systems further occasion additional cost and possible interruptions during removal of the insulation scrap.

In the automated placement of circuit wiring, it is often desirable to connect a number of soldering points with a single wire. There is thus a need for the partial stripping or stripping of sectional portions of continuous wires.

An object of the invention is to provide an arrangement and apparatus for stripping thermoplastic insulated wire in solid or stranded conductor form at sectional portions of continuous wire as well as at the ends. This arrangement should be very small and light in order to hold to the minimum the weight of the gripping arm when applied to industrial robots.

SUMMARY OF THE INVENTION

The problem is solved according to the principles of the invention through an arrangement in which a comb-like melting arbor movable toward the wire and equipped with a transverse groove of a size equal to the wire diameter is positioned above a uniformly heated platen, having poor heat conductivity or pre-heatable, that is preferably part of a wire guide and that further means are provided for pressing the arbor upon the wire with a predetermined force while it is momentarily heated, for example, by a current pulse.

In accordance with a further aspect of the invention, an arrangement, for example a tube, is provided in connection with the melting arbor for carrying off the removed insulating material.

With the illustrative embodiment in accordance with the invention the required stripping lengths can be exactly maintained even for the smallest dimensions. Further advantages resulting from the invention are:

partial stripping is possible.
simple and safe removal of the stripped-off material.
wire cannot be cut into.
no sharpening at installation and/or subsequent sharpening.
only one moving part is necessary.
the small, light and uncomplicated, construction meets the requirements for applications in connection with industrial robots.

BRIEF DESCRIPTION OF THE DRAWING

The inventive arrangement including its objects and further advantages will become apparent upon consideration of the following detailed description in conjunction with the accompanying figures.

DETAILED DESCRIPTION

Figure 1:
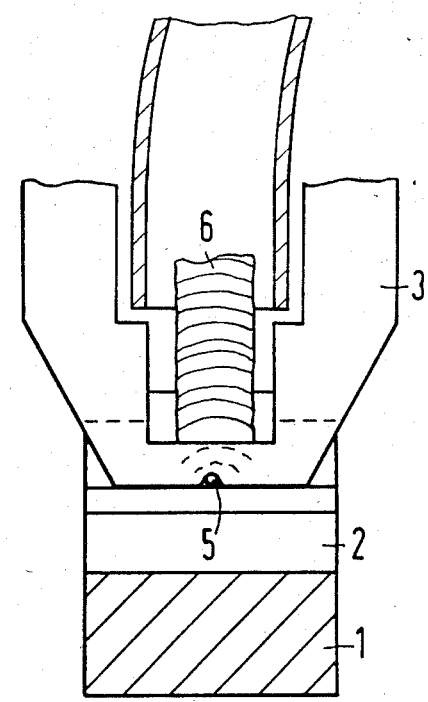
FIG. 1 illustrates a front view of the arrangement according to the invention.
Figure 2:
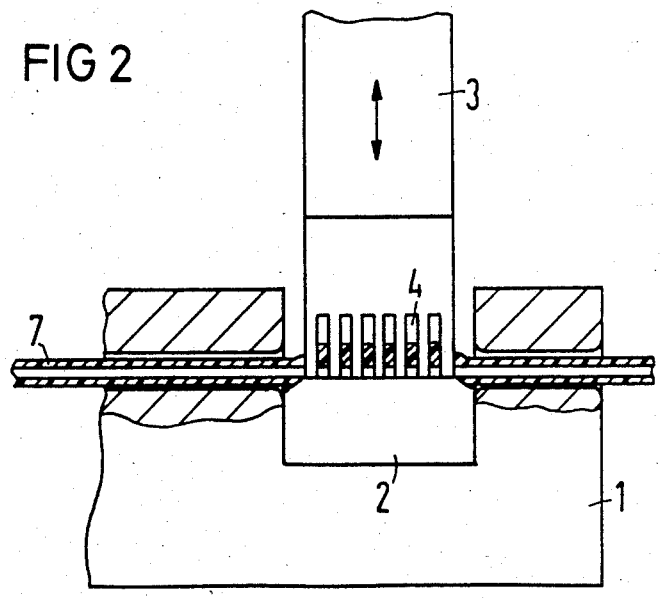
FIG. 2 shows a side view with the wire guide shown in cross section.

In FIG. 1, a uniformly heated platen 2 having a poor thermal conductivity is mounted on a wire guide 1. A melting arbor 3 is adapted to be fitted with comb-like slots 4 on its under side. This arbor is movable in a vertical direction (illustrated in FIG. 2) and has a transverse groove 5 equal in size to the wire diameter. The removed insulating material 6 is shown clearly in FIG. 1.

A single stripping operation procedure will now be described. The comb-like slotted arbor 3 provided with a transverse groove 5 having a size equal to the wire diameter is pressed against the wire 7 with a specific force. The latter lies upon a uniformly heated poor heat conducting platen 2.

By means of short term or momentarily heating of the melting arbor 3, for example by a current pulse, it presses through the insulation until it rests upon the platen 2. The melted insulation is forced into the slots 4 of the melting arbor. After cooling of the melting arbor to a favorable temperature depending on the insulating material, it is pulled away from the wire and the insulation captured between the slots 4 and any remaining insulation on the wire in thereby pulled away. The stripped insulation is pushed out of the melting arbor in chip form and may be removed, for example, by a tube.

There has thus been shown and described a novel wire stripping arrangement which fulfills all the objects and advantages sought therefor. Many changes, modifications, variations and other uses and applications of the subject invention will, however, become apparent to those skilled in the art after considering the specification and the accompanying drawings which disclose embodiments thereof. All such changes, modifications, variations and other uses and applications which do not depart from the spirit and scope of the invention are deemed to be covered by the invention which is limited only by the claims which follow.

What is claimed is:

1. An arrangement for the stripping of thermoplastic insulated solid and stranded wires partially as well as at the ends, the arrangement comprising a comb-like melting arbor and a heated platen, the comb-like melting arbor adapted to be moveable toward the wire and equipped with a transverse groove of a size equal to the wire diameter is positioned above a uniformly heated platen having low heat conductivity, the heated platen serving as part of a wire guide, and mechanical means for pressing the arbor upon the wire with a predetermined force while it is briefly heated.

2. An arrangement according to claim 1, wherein the heated platen is preheatable.

3. Arrangement according to claim 1, wherein the melting arbor comprises a tube for carrying away any removed insulating material.

* * * * *